May 26, 1970　　　　　　　　　C. D. HOY　　　　　　　　3,513,527
MANDREL DEVICE FOR ASSEMBLING AND SECURING LAMINATIONS
Filed April 10, 1967　　　　　　　　　　　　　　　2 Sheets-Sheet 1

INVENTOR.
CHARLES D. HOY
By White & Haefliger
ATTORNEYS.

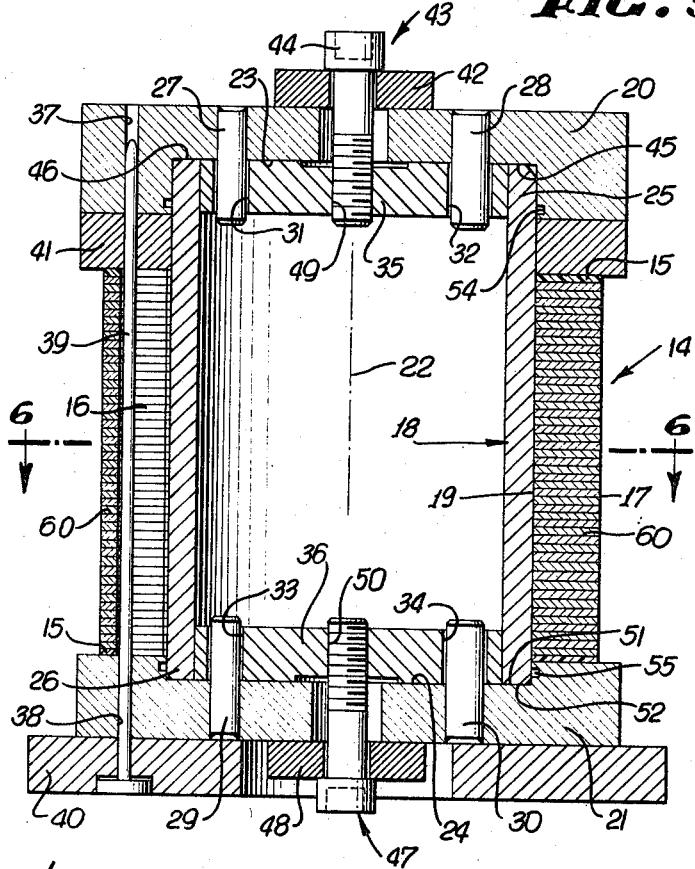

United States Patent Office 3,513,527
Patented May 26, 1970

3,513,527
MANDREL DEVICE FOR ASSEMBLING AND SECURING LAMINATIONS
Charles D. Hoy, Anaheim, Calif., assignor to Task Corporation, Anaheim, Calif., a corporation of California
Filed Apr. 10, 1967, Ser. No. 629,539
Int. Cl. K02k 15/00
U.S. Cl. 29—205                                                7 Claims

ABSTRACT OF THE DISCLOSURE

The disclosure concerns a mandrel device for assembling and securing thin rotor or stator laminations in a stack for use in electrical machinery. Annular laminations are assembled on a central mandrel, preferably with zero clearance; also platens at opposite ends of the stack are interconnected in the mandrel for exerting force holding the stack in endwise compressed condition. The stack periphery then being entirely exposed for application of a fluid bonding agent which penetrates between the laminations.

BACKGROUND OF THE INVENTION

This invention relates generally to the fabrication of bonded stacks of laminations, and more particularly concerns the bonding together of thin rotor or stator laminations in a stack for use in electrical machinery.

In the past, laminations have been bonded by applying the liquid form bonding agent to the faces of the laminations, which were then pressed together and cured. This procedure creates certain problems, including the tendency of excess bonding agent to exude at the edges of the stack, as for example adjacent slots which are to receive conductor bars, requiring an expensive and time consuming clean-up operation.

SUMMARY OF THE INVENTION

It is a major object of the present invention to provide a mandrel device for assembling and securing laminations so as to obviate the above-outlined difficulties and expense, and also to provide highly advantageous tooling and procedures by which stacks of bonded laminations may be quickly and efficiently produced. Basically, and in accordance with the invention, a stack of annular laminations is mounted on a mandrel so that the mandrel is received axially within the stack, the laminations containing circularly spaced through perforations for receiving electrical conductors extending endwise of the stack and spaced inwardly of the stack periphery; platens are provided at opposite ends of the stack and interconnected via the mandrel for exerting force holding the stack in endwise compressed and squared condition with the laminations retained in planes generally normal to the axis during bonding; and a lamination bonding agent is applied to the periphery of the compressed stack so that the bonding agent penetrates between the laminations in response to capillary attraction forces and without flowing into the lamination perforations. In this regard, the advantage is afforded that the bonding agent may be applied to the stack periphery without interference from the mandrel, since it is concealed within the stack. Typically, the laminations are assembled on the mandrel with essentially zero clearance between the mandrel outer periphery and the lamination inner peripheries for exact alignment. Also, the laminations are typically metallic and are at elevated temperature during assembly to promote the capillary attraction induced penetration.

Additional objects and advantages include the provision of non-metallic insulative laminations at opposite ends of the stack; the provision of a replaceable spacer ring between one end of the stack and the platen at that end to accommodate lamination stacks of different length; the provision of interengageable stop shoulders so located on the mandrel and on the platen at the spacer ring end of the stack as to limit stack compression with predetermined precision; the provision of a locating pin carried by at least one platen and penetrating aligned perforations in the laminations inwardly of the stack periphery; provision for detachable connection of the mandrel with both platens so that the laminations may be assembled on the mandrel in one relative axial direction and removed off the mandrel in a continuation of that one axial direction, one platen being detachable from the mandrel during assembly of the laminations on the mandrel, and the other platen being detachable from the mandrel during bonded stack removal off the mandrel; and the provision of annular wicking structure proximate the lower end of the upright stack to intercept drainage of liquid bonding agent at the inner periphery of the stack.

These and other objects and advantages of the invention, as well as the details of illustrative embodiments, will be more fully understood from the following detailed description of the drawings, in which:

BRIEF DESCRIPTION OF THE DRAWINGS

FIG. 5 is a vertical section showing the overall assembly;

FIG. 6 is a horizontal section taken on line 6—6 of FIG. 5; and

FIG. 7 is a perspective showing of the mandrel.

DESCRIPTION OF THE PREFERRED EMBODIMENTS

Figure 1:
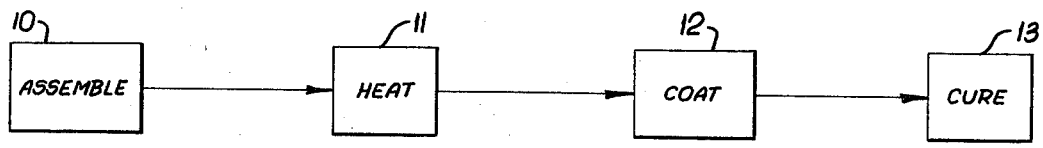
FIG. 1 is a block diagram illustrating the steps involved in the bonding procedure.

Referring first to FIG. 1, the block 10 concerns the assembly of the laminations in tooling prior to heating of the laminations indicated at 11. Block 12 refers to coating of a suitable bonding agent such as liquid epoxide resin on the periphery of the stack of heated laminations and finally block 13 has reference to curing of the resin in situ.

Concerning first the assembly 10, reference is made to FIG. 5 wherein the numeral 14 designates generally a stack of annular laminations for use in a rotary electrical machine, the bulk of the laminations being metallic, while the end laminations 15 are insulative or non-metallic. As seen in FIG. 6, the laminations contain circularly spaced through perforations or slots 16 adapted to receive electrical conductors or bars extending endwise of the stack and spaced inwardly of the stack periphery 17; however, the bars have not yet been inserted into the slots. It will be understood that the laminations may be assembled one at a time onto the cylindrical mandrel 18 which is shown as received axially centrally within the stack. In this regard, the laminations are assembled with essentially zero clearance between the mandrel outer periphery and the lamination inner peripheries 19 for purposes of precision centering of the laminations. This is facilitated by slightly bowing the laminations as they are dropped onto the mandrel individually.

Further in accordance with the invention, means including platens 20 and 21 are provided at opposite ends of the stack 14 and interconnected via the mandrel 18 for exerting force holding the stack in endwise compressed condition with the laminations retained in planes generally normal to the central axis 22, whereby the stack 14 is assembled in precisely squared condition with respect to that axis. In this regard, the platens are preferably cup-shaped providing recesses 23 and 24 for reception of the mandrel terminals 25 and 26. Also, the platens carry dowels seen at 27 through 30 which are respectively receivable in the openings 31 through 34 in the mandrel end plates 35 and 36, for angularly locating the platens so as to align other openings 37 and 38 therein. As a result, the lamination locating pins 39 of which there are three illustrated are receivable in the openings 37 and 38, and at the same time penetrate the slots 16 for aligning the latter, the pins having diameters substantially the same as the width of the slots at the location seen in FIG. 6. The pins are typically carried by a base plate 40, and are guided by platen 21 that is mounted to end plate 36 of the mandrel.

Figure 3:
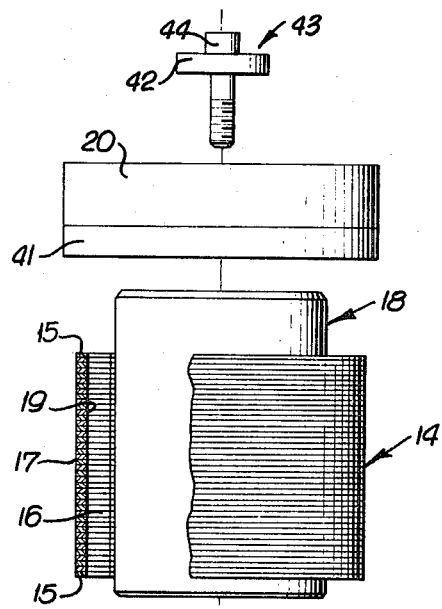
FIG. 3 is an exploded elevational showing of the overall assembly.
Figure 4:
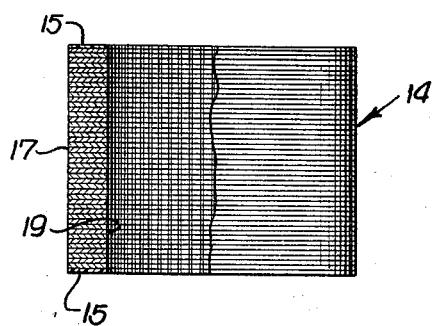
FIG. 4 is an elevational showing of the lamination assembly.

During the assembly, the individual laminations may be dropped one at a time onto the mandrel, with the pins 39 in the positions indicated as seen in FIG. 3, the upper platen 20 at this time being removed. Upon completion of lamination assembly onto the mandrel, a spacer ring 41 is located on the mandrel and at the upper end of the stack for applying predetermined compression to the stack during completion of the assembly. In this regard, spacer rings 41 of different axial thickness may be provided, depending upon the number of laminations to be used in the stack, and also depending upon the final pressure to be exerted.

Completion of the assembly involves placement of the upper platen 20 onto the mandrel to exert pressure on the ring 41, placement of a U-shaped spacer 42 in position as shown, and connection of a fastener 43 with the mandrel end plate 35 resulting in transmission of force downwardly from the fastener head 44 to the spacer 42 and to the upper platen 20. In similar manner, the lower platen 21 is connected to the mandrel lower end plate 36 by means of a fastener 47, the head of which transmits pressure to the platen via the spacer ring 48. The fasteners are thread connected to the end plates 35 and 36 at locations 49 and 50. When the inner shoulder 45 of the upper platen 20 engages the upper end 46 of the mandrel, the lamination stack has been compressed to predetermined extent. The plate 40 is removed along with pins 39, and the assembly is then in condition to be coated with the liquid bonding agent for bonding of the laminations. Note in this regard, that the lower platen inner surface 51 has previously been engaged against the lower terminal 52 of the mandrel.

Figure 2:
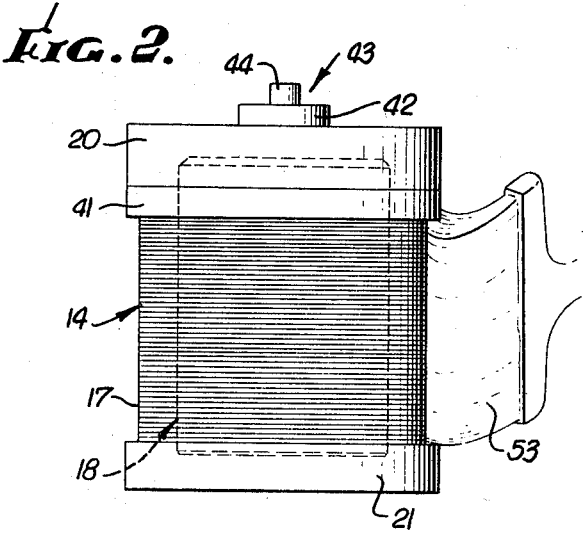
FIG. 2 is an elevational showing of the assembled stack, mandrel and platen structure, with application of bonding agent.

The laminations are then typically heated to elevated temperature, as for example between 300 and 400° F. This heating step being indicated at 11 in FIG. 1. Following this step, the epoxide bonding agent is applied to the lamination periphery 17, as for example by brushing indicated at 53 in FIG. 2. Such application may also be carried out as by rolling of the bonding agent onto the stack periphery. FIG. 5 also illustrates the provision of annular wicking grooves 54 and 55 in the bores of the platens 20 and 21, the grooves being exposed toward the outer periphery of the cylindrical mandrel. Such grooves act to intercept travel of the liquid bonding agent during creeping thereof along the surface of the mandrel and toward the platens. Therefore, the bonding agent cannot reach the inner surfaces 23 and 24 of the platens, it being necessary to maintain those inner surfaces in condition for engagement against the ends of the mandrel for exact spacing purposes as is clear from what has been said above. Typically, the travel of the bonding agent as described takes place by gravitational drainage or by capillary attraction. Such capillary attraction is also responsible for inward penetration of the bonding agent at the interfaces 60 between the engaged surfaces of the laminations, heating of the latter facilitating more rapid penetration by reducing the viscosity of the bonding agent. It should also be pointed out that the bonding agent does not exude into the slots 16 which are therefore left clear for insertion of the electrical conductor bars.

Referring back to FIG. 1, the bonding agent is finally cured in situ as in an oven at elevated temperature, for example between 325 and 375° F. for one hour. Following such curing, the stack 14 which is now bonded is removed from the tooling in the manner now to be described. The fastener 47 is removed and the spacer 48 and platen 21 are removed. This allows the removal of the bonded stack 14 off the mandrel in the same direction, i.e. downward, as the laminations were first placed on the mandrel. As a result, no reverse bowing of the laminations can occur inasmuch as the drag on the lamination inner periphery, during removal, is in the same direction as existed during their mounting on the mandrel. Consequently, any tendency to fracture the bonds between the laminations is minimized, particularly in view of the somewhat forcible removal of the stack off the mandrel as becomes necessary by virtue of the zero clearance condition previously mentioned. All of the foregoing is made possible by having end platens which are separately connectible to and detachable from the mandrel as described.

I claim:

1. A mandrel device including platens adapted to compress opposite ends of a stack of laminations containing circularly spaced through perforations for receiving electrical conductors extending endwise of the stack and spaced inwardly of the stack periphery, said mandrel device including a central mandrel adapted for assembling laminations on said central mandrel with essentially zero clearance between the outer periphery of the mandrel and the inner peripheries of the laminations, the platens being interconnected with the mandrel so as to exert force for holding said stack in endwise compressed condition with the laminations retained in planes generally normal to the axis of the mandrel, a locating pin carried by at least one platen and penetrating aligned perforations in the laminations, and substantially annular wicking structure proximate the lower end of the stack to intercept travel of a bonding agent at the inner periphery of the stack.

2. The combination of claim 1, in which the end laminations of the stack are insulative, the bulk of the stack laminations being metallic.

3. The combination of claim 1, in which the laminations are at a temperature substantially in excess of 150° F.

4. The combination of claim 1, including a spacer ring between one end of the stack and the platen at said end.

5. The combination of claim 4, in which the mandrel and the platen at the spacer ring end of the stack carry interengaged stop shoulders limiting compression of the stack.

6. The combination of claim 1, in which the mandrel has detachable connection with both platens so that the laminations may be assembled on the mandrel in one relative axial direction and removed off the mandrel in a continuation of said one axial direction, one platen being detachable from the mandrel during assembly of the laminations on the mandrel, and the other platen being detachable from the mandrel during bonded stack removal off the mandrel.

7. The combination as defined in claim 1, wherein the mandrel extends upwardly.

References Cited
UNITED STATES PATENTS

| | | | |
|---|---|---|---|
| 1,090,920 | 3/1914 | Knight | 29—205 |
| 1,762,017 | 6/1930 | Grenzer. | |
| 2,125,970 | 8/1938 | Waters | 29—609 X |
| 2,577,187 | 12/1951 | Fox | 29—489 X |
| 3,348,300 | 10/1967 | Lindgren | 29—596 |

THOMAS H. EAGER, Primary Examiner

U.S. Cl. X.R.

29—203, 489, 596, 609; 156—222; 228—49